United States Patent [19]

Dosjoub

[11] Patent Number: 5,052,456
[45] Date of Patent: Oct. 1, 1991

[54] DEVICE FOR DEFLATING A TIRE WHEN ROTATING

[75] Inventor: Andre Dosjoub, Chamalieres, France

[73] Assignee: Compagnie Generale Des Etablissements Michelin-Michelin & Cie, Cleremont-Ferrand, France

[21] Appl. No.: 467,020

[22] Filed: Jan. 18, 1990

Related U.S. Application Data

[62] Division of Ser. No. 218,557, Jul. 13, 1988, Pat. No. 4,922,984.

[30] Foreign Application Priority Data

Jul. 15, 1987 [FR] France ................ 87 10100

[51] Int. Cl.$^5$ .................. B60C 23/12; F04B 17/06
[52] U.S. Cl. .................... 152/415; 152/427; 417/231; 417/233; 417/476
[58] Field of Search .............. 152/415, 416, 417, 418, 152/421, 422, 423, 427, 509, 510, 511; 417/229, 231, 233, 474, 476; 418/45

[56] References Cited

U.S. PATENT DOCUMENTS 2,719,560 10/1955 Caldwell ................ 152/419

FOREIGN PATENT DOCUMENTS 98536 3/1897 Fed. Rep. of Germany .
943377 10/1948 France .
1025178 9/1950 France .
1129903 9/1956 France .
2491866 4/1982 France .
694476 7/1953 United Kingdom .
1017074 1/1966 United Kingdom .

Primary Examiner—Michael W. Ball
Assistant Examiner—Gregory J. Wilber
Attorney, Agent, or Firm—Oblon, Spivak, McClelland, Maier & Neustadt

[57] ABSTRACT

In order to provide for the deflation of a tire, there is provided an orifice in the rim of a wheel, a pusher element extending through the rim in a gas tight manner, the pusher element having one end communicating with gas pressure inside the tire and including means for selectively closing the orifice. The pusher element is mounted to the rim for movement between a first position wherein the means for selectively closing closes the orifice and a second position wherein the means for selectively closing opens the orifice. The pusher element has another end outside of the tire with a cam mounted thereto. A presser means mounted to be stationary relative to the rotation of the tire selectively engages the cam and moves the pusher element to the second position to control the opening of a valve to deflate the tire.

2 Claims, 6 Drawing Sheets

DEVICE FOR DEFLATING A TIRE WHEN ROTATING

This is a division of application Ser. No. 07/218,557, filed on July 13, 1988, now U.S. Pat. No. 4,922,984.

BACKGROUND OF THE INVENTION

1. Field of the Invention

This invention relates to a device intended to be mounted on the wheel of a vehicle, able to assure the inflation of the tire, as well as deflation, when the wheel is rotating.

2. Background of the Related Art

The inflation pressure of tires is a very important parameter for good operation of the tires. It is important to maintain this pressure at a rated level. In some cases, it is even desirable to be able to modify the pressure as a function of the conditions of use of the vehicle. Therefore, systems have been developed which are able to assure inflation of tires even when they are being used. For example, systems are known which include a rotating joint transmitting the pressure from a stationary space, i.e., the vehicle itself, to the mobile space in rotation, i.e., the wheel. Systems are also known which use the deformation of the tire to pump air. If these latter are able to avoid the use of a rotating joint, their construction is so complex that they have never been developed on an industrial scale.

SUMMARY OF THE INVENTION

The object of the invention is to provide a simple device which is able to assure inflation of a tire when it is traveling and which does not require a rotating joint.

The invention also has as an object a means to allow the deflation of the tire while it is rotating.

In order to insure the inflation of the tire there is provided a deformable hose mounted for rotation with the tire and arranged at least in part substantially along an arc of a circle coaxial with the tire. The hose has one open end in communication with atmospheric pressure and another open end in communication with a gas pressure inside the tire. Means are provided for locally reducing the sectional area of the hose when the tire is mounted on the vehicle, the reducing means being stationary relative to the rotation of the tire. A check valve is connected between another end of the hose and the gas pressure inside the tire for permitting gas flow only from the hose to a volume inside the tire. As a result, a rotation of the tire causes a local reduction in the sectional area of the hose to move along the length of the hose and compress the air therein, the compressed air pressure being transferred to the volume inside the tire via the another end of the hose.

In order to provide for the deflation of the tire, there is provided an orifice formed in a rim of the wheel, a pusher element extending through the rim in a gas tight manner, the pusher element having one end communicating with gas pressure inside the tire and including means for selectively closing the orifice. The pusher element is mounted to the rim for movement between a first position wherein the means for selectively closing closes the orifice and a second position wherein the means for selectively closing opening the orifice. The pusher element has another end outside of the tire with a cam mounted thereto. A presser means mounted to be stationary relative to the rotation of the tire selectively engages the cam and moves the pusher element to the second position to deflate the tire.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
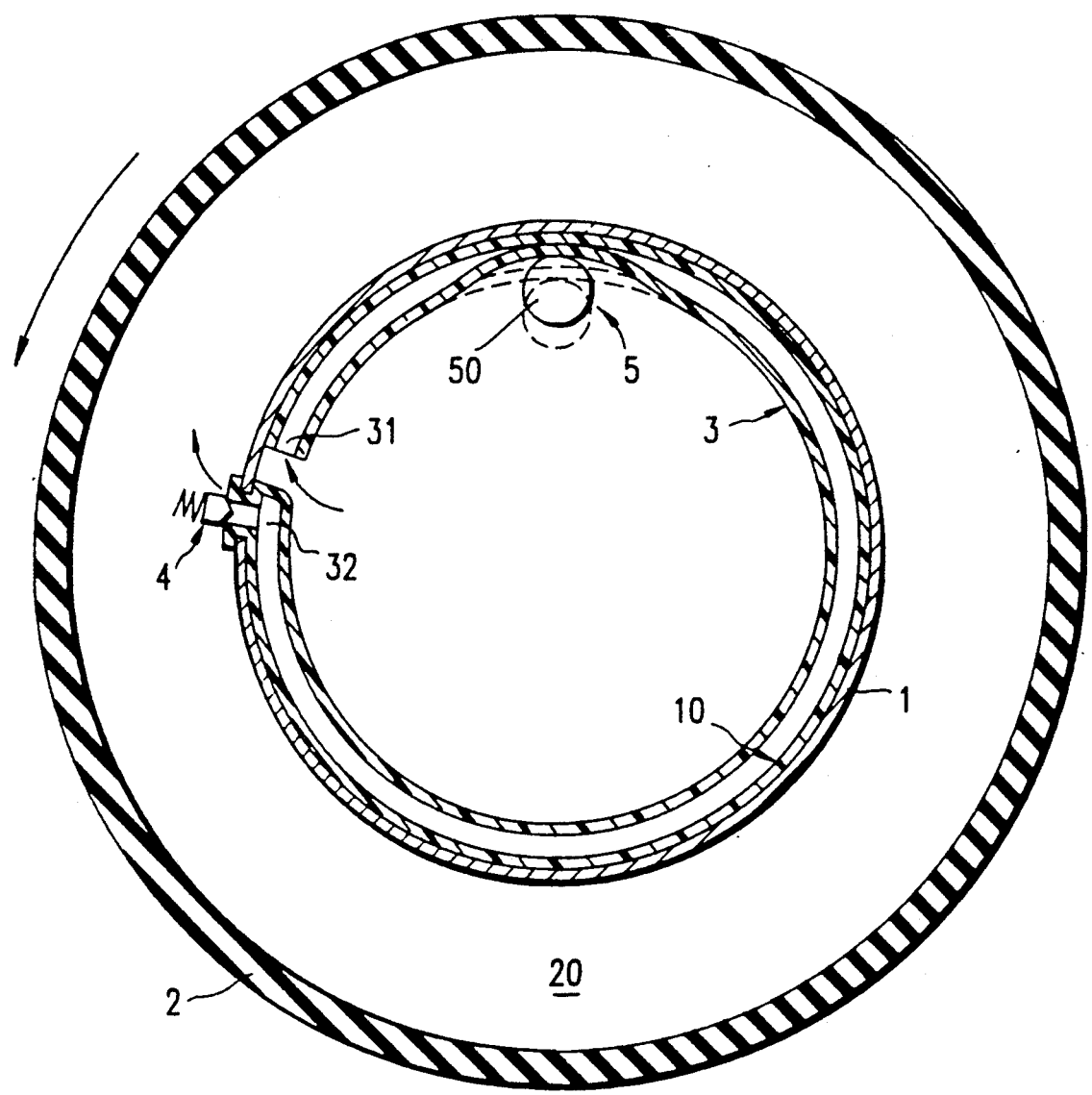
FIG. 1 is a section schematically showing the general arrangement of the inflation device.

A rim 1 carrying a tire 2 is shown schematically in FIG. 1. The inside volume of the tire is designated as 20. The air necessary for inflation of tire 2 is compressed by locally reducing a sectional area of, i.e., crushing, a hose 3 and by moving the constriction thus made from orifice 31, at one open end of the hose 3 in communication with the atmospheric pressure, to opposite orifice 32, at an other open end of the hose and connected to inside volume 20 of tire 2. Hose 3 is rotationally fixed to tire 2. In order to provide this constriction in a simple fashion, hose 3 is arranged at least in part in a circle concentric with the tire and is fastened, for example by gluing, to radially inside face 10 of rim 1.

The constriction is caused by the action of a reducing means in the form of a presser 5 rotationally fixed relative to a stationary space, for example by being mechanically fixed to the wheel carrier (not shown). Hose 3 is oriented so that, during rotation of tire 2 and due to the movement of the stationary presser 5 (relative to the rotation of tire 2), air is forced from orifice 31, forming an air intake, toward orifice 32. A check valve 4 is placed between orifice 32 and inside volume 20.

Orifice 31 may be positioned at any desired spot, preferably at a location in which it is protected from dirt and water spray. The part of the hose that is used for pumping therefore is that which is arranged approximately circularly. Preferably, check valve 4 is placed as close as possible to the end of the portion of hose 3 which is crushed by the presser.

The presser preferably consists of a roller 5 which is held away from hose 3 when the device is at rest and which presses the hose against rim 1 only when it is desired to cause inflation. Roller 5 is rotatable around a pin 50, which is fixed relative to a journal 5a mounted to the wheel carrier The functioning of the device is very simply controlled by altering the radial position of roller 5. For example, the roller 5 is held away from the rim in a rest position, and against the hose in an active position (hose 3 crushed), by the action of an electromagnetic fluid actuator 5b connected to the journal 5a, or by any other suitable means.

Figure 2:
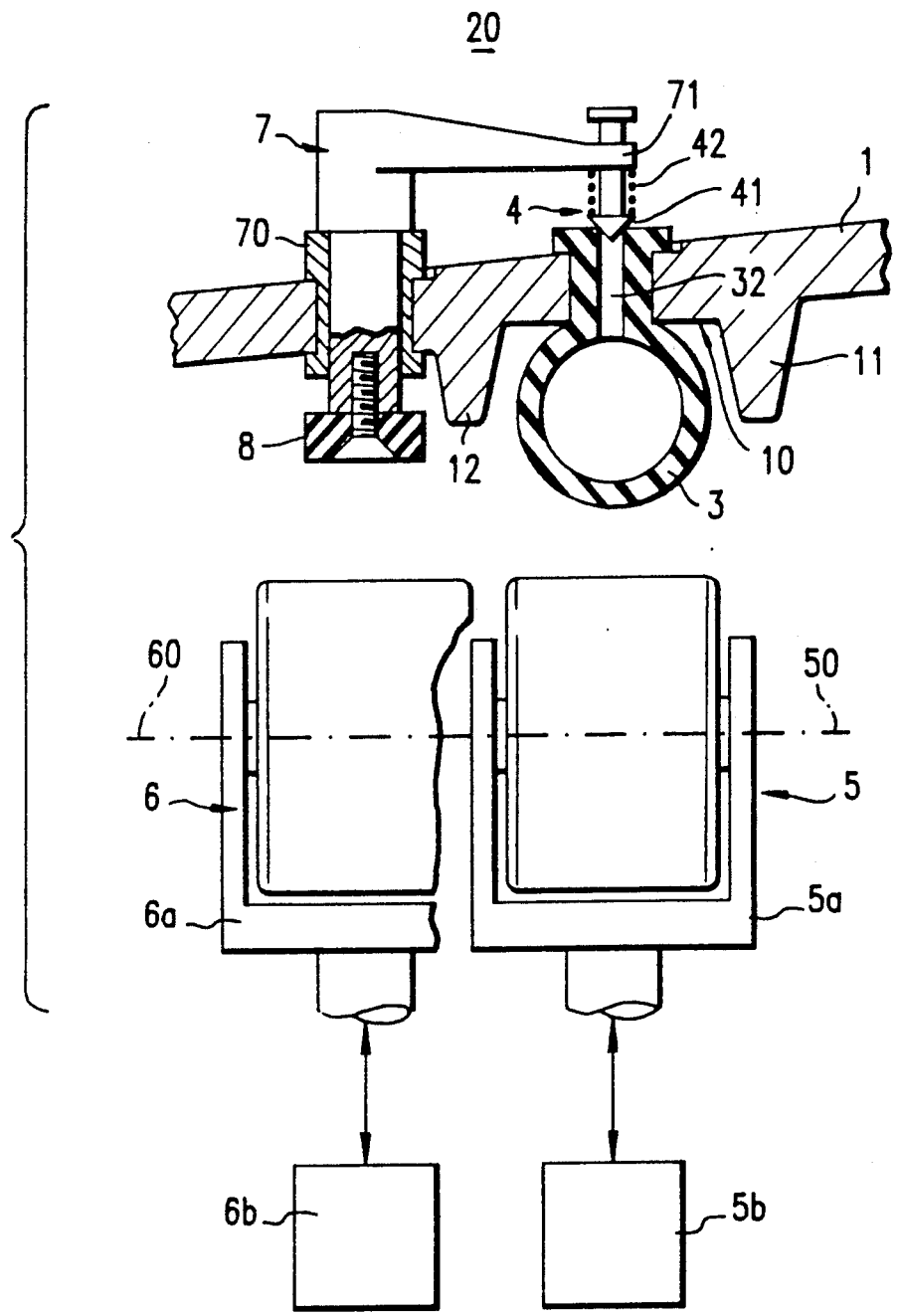
FIG. 2 shows a detail of the inflation device and of the deflation device, in a rest position.
Figure 3:
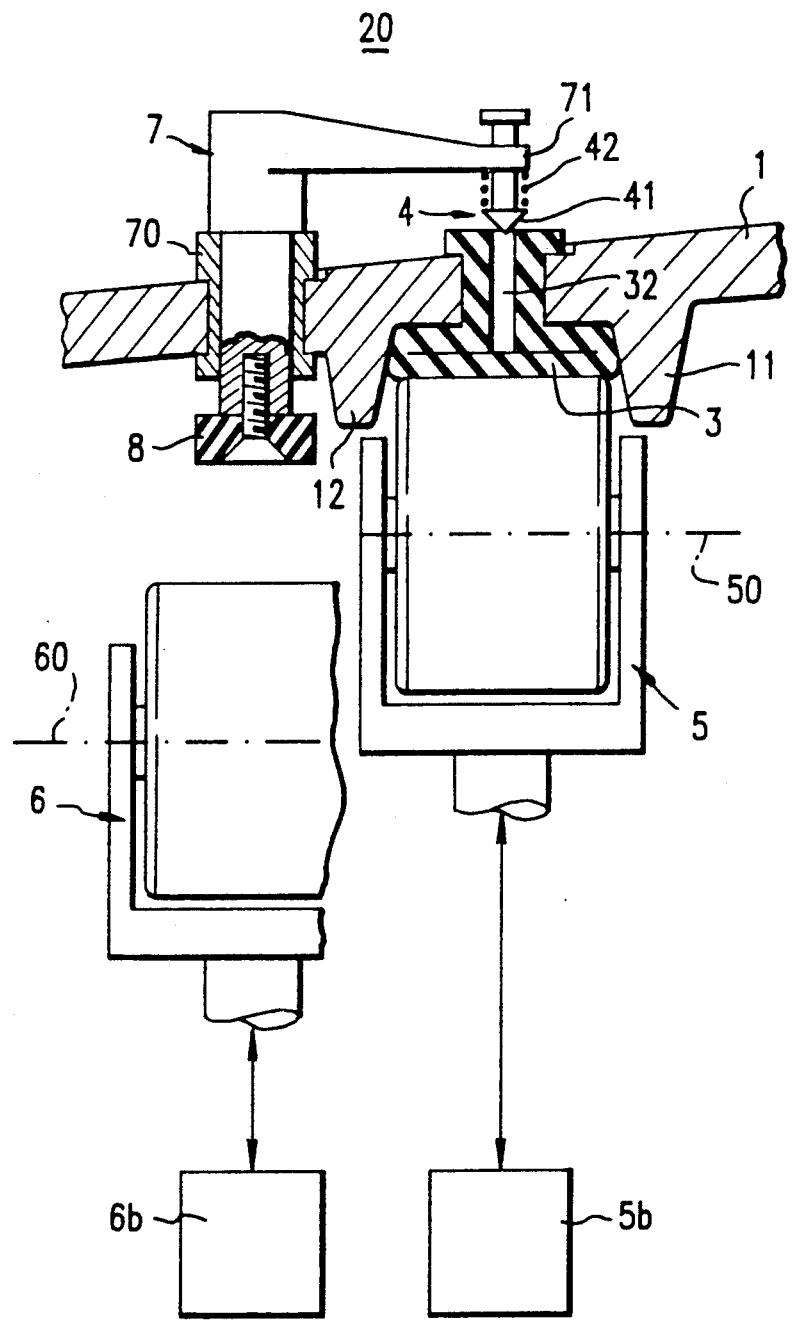
FIG. 3 shows the same detail, in an inflation position.

In the drawings, roller 5 is shown in an active position in solid lines in FIG. 1 and is also shown in FIG. 3. It is shown in a rest position in FIGS. 2 and 4 and, in broken lines, in FIG. 1. To assure maximum efficiency of the device, roller 5 sufficiently deforms hose 3 to close the inner section of the hose during its passage.

The size of the section of hose 3 is determined as a function of the desired speed of inflation for tire 2. If necessary, several hoses can be placed in parallel or else the hose can be formed as a coil to assure compression of the air over more than one revolution. In any case, there should be provided means for axially guiding roller 5 along hose 3. For example, projections 11, 12 may be placed on rim 1 (FIG. 2) to guide roller 4 axially when it crushes hose 3.

It is also possible for hose 3 to extend along less than one revolution, i.e., over an arc only. In this case, it is possible to place several hoses in an arc, with a check valve 4 for each one.

Use of an inflation device according to the invention is most advantageous when it is associated with a system assuring constant control of the pressure of the tire. For example, the roller 5 may be advanced to an active position by the electromagnetic actuator (shown schematically as 5b in FIG. 2) responsive to a detected value of the pressure, i.e., an electric pulse is provided to the actuator so long as the pressure in the tire is insufficient. The great advantage of this arrangement is to be able to continuously compensate for normal pressure losses, without the driver being concerned. Since control of inflation is performed solely in the stationary space, this advantage is very simple to achieve.

Because it provides a simple and reliable solution to the problem of inflation of tires during travel, the device according to the invention also makes it possible to envisage causing deflation of the tire so as to offer, on demand, the optimum inflation pressure of the tire for the use of the moment. By associating the device with a permanent system of control pressure and with a deflation system, it is possible to achieve a wheel whose tire inflation pressure becomes a parameter on which it is possible to act constantly.

By way of example, the deflation system can neutralize the checking effect of the check valve 4, letting air escape to reduce inflation pressure, depending on the signal it receives FIGS. 2 to 6 show a device for deflation of a tire in rotation, comprising a pusher 7 going through rim 1 on which tire 2 is mounted, whose end 7A (FIG. 4) in the interior of the tire controls the opening of orifice 32 to let the air contained in the pneumatic enclosure escape, and to whose opposite end 7B is fixed a cam 8 intended to work with second presser which is rotationally fixed, in order to cause deflation. Cam 8 comprises a resilient blade having ends resting on the rim with means for biasing the pusher element into a rest position.

Thus, control of deflation is also performed from the stationary space. The second presser is formed by a roller 6, rotatable around a pin 60 fixed to journal 6a. The roller 6 is mounted to the wheel carrier and, therefore, just like roller 5, is rotationally fixed relative to the stationary space. The roller 6 may be advanced in the same way as the roller 5, i.e., by an electromagnetic actuator 6b. When it is desired to deflate the tire, roller 6 is caused to press on deflation pusher 7, which causes an equivalent movement of support 71 for needle 41 of valve 4 in opposition to spring 42. As needle 41 is lifted, it uncovers orifice 32 to allow passage of air. Pusher 7 achieves a tight passage through rim 1 thanks to joint 70 and provides radial positioning of needle 41.

Cam 8 is formed of resilient material and so acts as a spring to hold check valve 4 pressed against orifice 32 in the rest position. The cam 8 also acts as a track so that pusher 7 works with roller 6 acting as a presser when roller 6 is radially moved toward the rim. It therefore constitutes a control cam of pusher 7.

Figure 4:
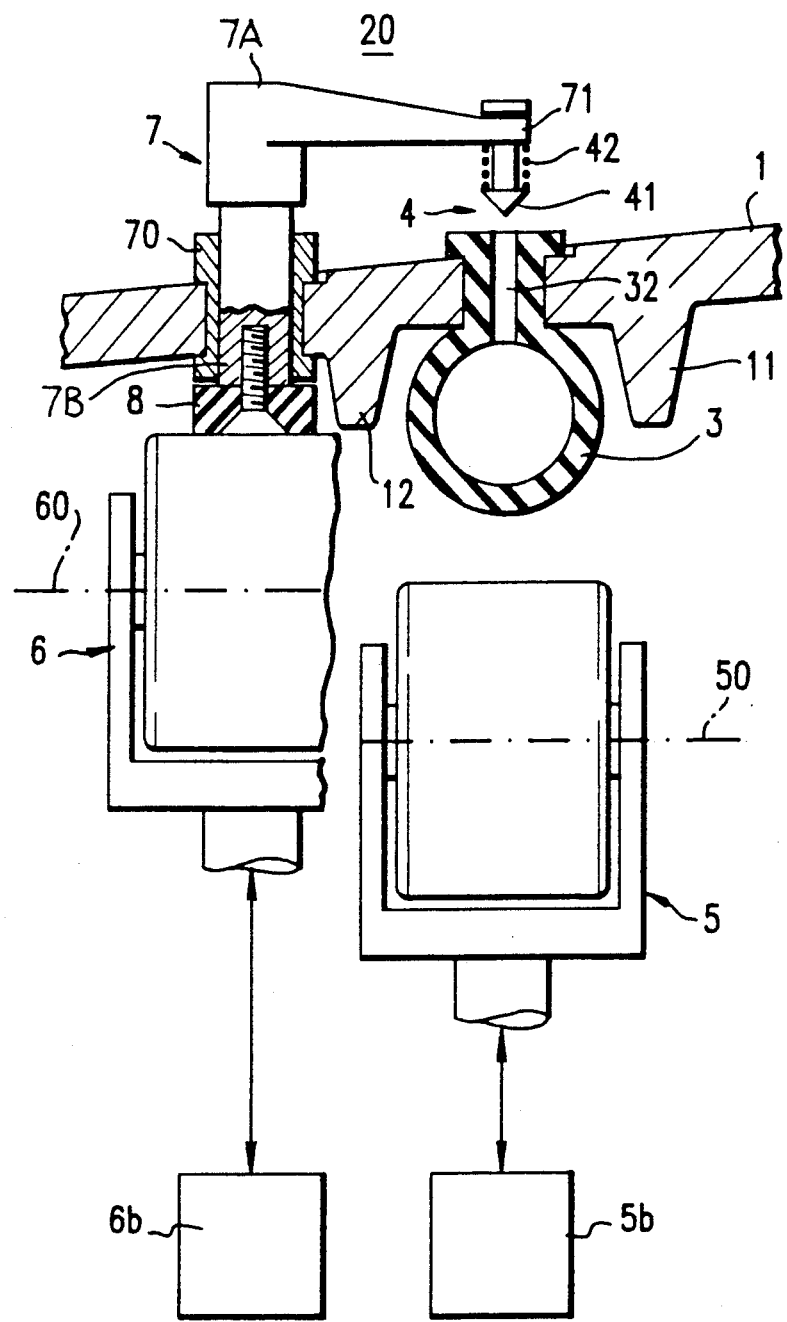
FIG. 4 shows the same detail in a deflation position.
Figure 5:
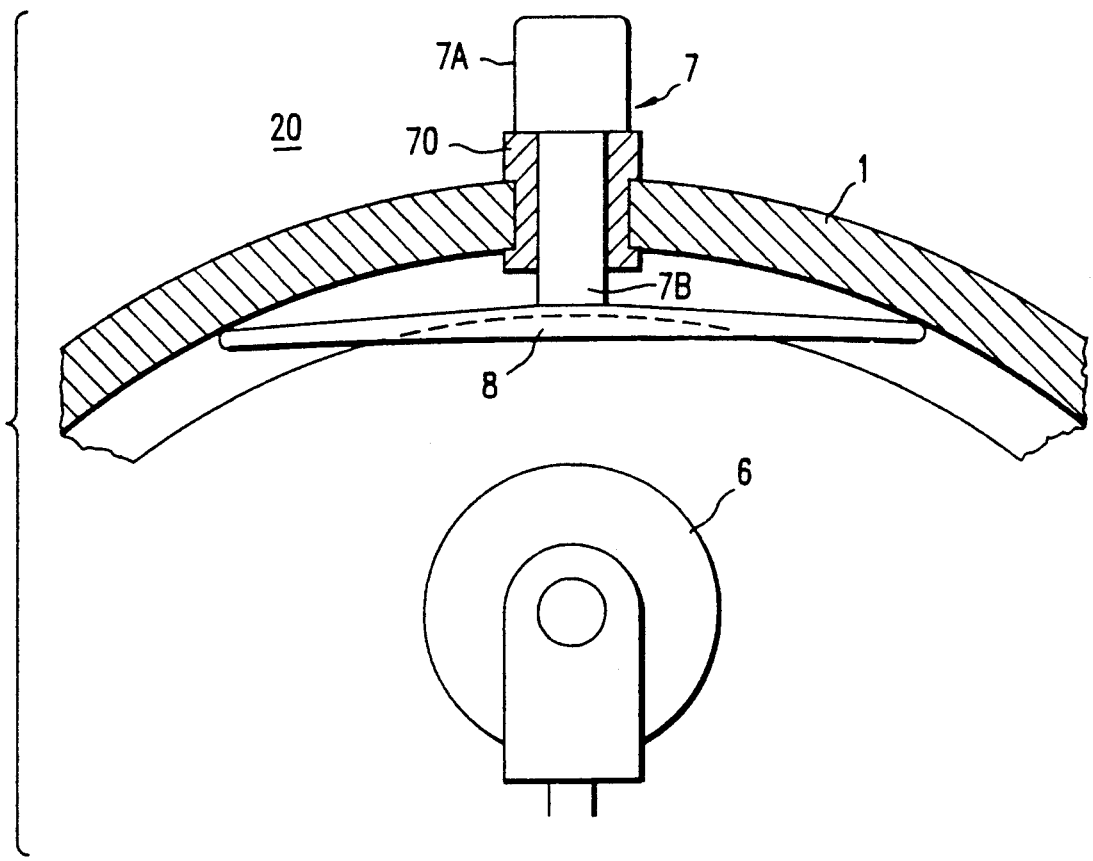
FIGS. 5 and 6 show, in section, the control of deflation.
Figure 6:
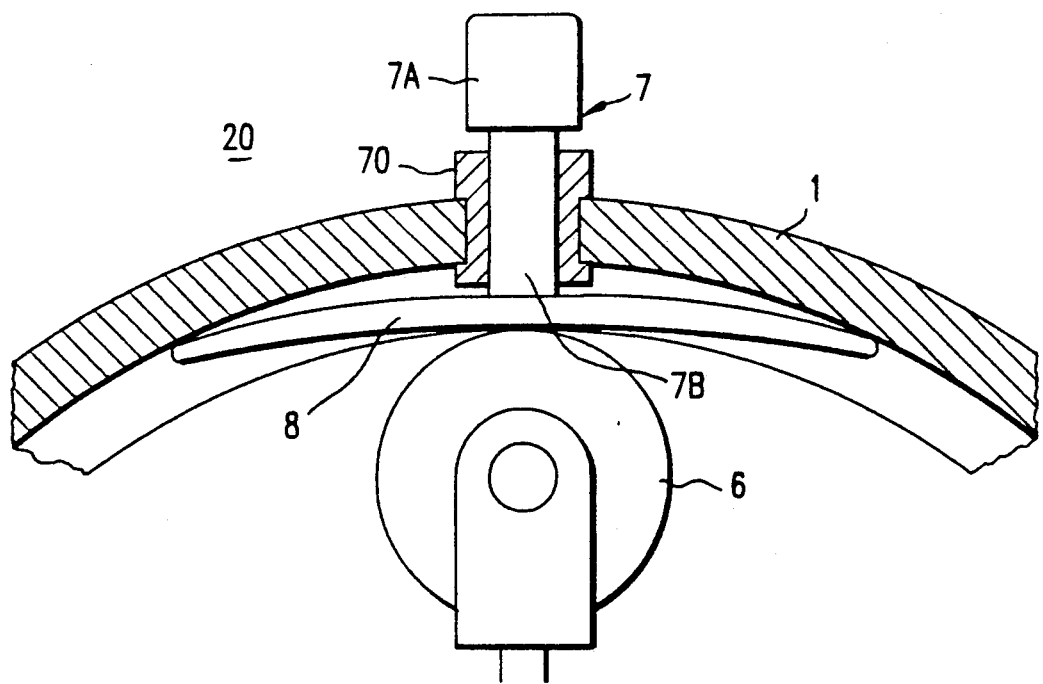

Therefore it is seen that when tire 2, mounted on rim 1, rotates, and the radial position of roller 6 is moved to the level shown in FIG. 4, check valve 4 is lifted during a portion of each revolution, thus allowing a little air to escape through hose 3 to reduce the inflation pressure. For control of roller 6, it is possible, for example, to provide that it is moved radially from a rest position toward the rim by any suitable means such as that used for roller 5, until rolling permanently on projection 12 forming a radial stop. It is thus possible to control inflation and deflation by separate rollers, each having a radial positioning system as illustrated, these latter being, if necessary, slightly axially offset; it is also possible to control the inflation or deflation by the same roller having an axial positioning system.

Therefore, this invention makes it possible to achieve an active wheel, i.e., a wheel whose tire inflation pressure is a parameter which is controlled without having to send a command (electric, hydraulic or pneumatic) into the mobile space in rotation to make the inflation pressure vary.

The following illustrates another application of the invention where it is the tire itself which compensates somewhat for an air leak.

Figure 7:
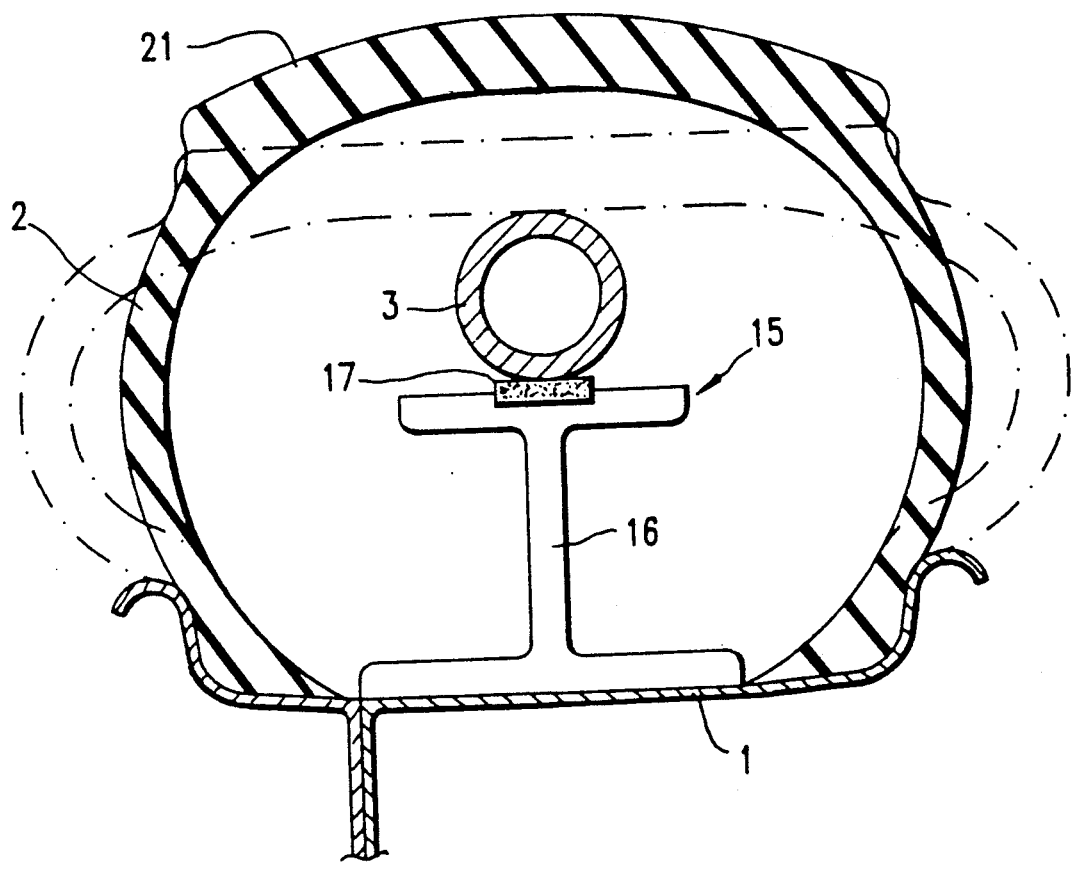
FIG. 7 shows a variant of the embodiment of the inflation device with the tire inflated and deflated.

FIG. 7 shows a variant of the invention where the means to assure inflation by reducing the sectional area of a hose makes use of tread 21 of tire 2. Here the inside face of tread 21, in case of deflation as shown in chain lines, rests directly on hose 3 fastened, at least in part, on radially outside periphery 15 of an element 16 of rim 1. The inside face of tread 21 actually constitutes the non-rotatable means for pressing on hose 3 when deformed by contact with the road. Collapsing of tread 21 thus constitutes a means equivalent to bringing roller 5 near the hose in the earlier embodiment. Hose 3 therefore is positioned on the inside of tire 2. Of course, one end of the hose goes through the rim to the outside of the tire to form the suction orifice 31.

Element 16 of rim 1 is to be understood to be either an annular support attached to the inside of the rim and intended to support the load when tire 2 is deflated, as shown in FIG. 7, or a part of the rim itself designed for this purpose, for example, the middle zone of a rim for a reverse hooked tire of the type shown by the German patent application DE 30 19 742. Thanks to this inflation device, it is possible to provide more flexibility to a support for emergency traveling with a moderate but not zero inflation pressure.

It is also possible to insert, between the rigid support 16 (outside periphery 15) and hose 3, a spacing piece 17, for example of solid rubber, incapable of carrying the load, but which makes it possible to assure early contact between the hose 3 and tread 21 during collapsing of the latter.

Obviously, numerous modifications and variations of the present invention are possible in light of the above teachings. It is therefore to be understood that within the scope of the appended claims, the invention may be practiced otherwise than as specifically described herein.

What is new and desired to be secured by letters patent of the U.S. is:

1. A device for deflating a rotating tire mounted on a rim and comprising:

a rim having an orifice formed therein;

a pusher element extending through said rim in a gas tight manner, said pusher element having one end communicating with gas pressure of a volume inside the tire and including means for selectively closing said orifice, said pusher element being mounted to the rim for movement between a first position wherein said means for selectively closing closes said orifice and a second position wherein said means for selectively closing opens said orifice, said pusher element having another end outside of the tire;

a cam mounted to said another end of the pusher element; and presser means mounted stationarily relative to the rotation of the tire for selectively engaging said cam and moving said pusher element to said second position to selectively reduce the pressure in the tire.

2. The device of claim 1 wherein said cam comprises a resilient blade having ends resting on the rim, said blade comprising means for biasing said pusher element into said first position.

* * * * *